US010924266B2

(12) United States Patent
Ohtani et al.

(10) Patent No.: US 10,924,266 B2
(45) Date of Patent: Feb. 16, 2021

(54) COMMUNICATION APPARATUS, COMMUNICATION SYSTEM, AND COMMUNICATION CONTROL METHOD

(71) Applicant: FUJITSU LIMITED, Kawasaki (JP)

(72) Inventors: Takeshi Ohtani, Kawasaki (JP); Itaru Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 270 days.

(21) Appl. No.: 15/908,432

(22) Filed: Feb. 28, 2018

(65) Prior Publication Data

US 2018/0270050 A1 Sep. 20, 2018

(30) Foreign Application Priority Data

Mar. 14, 2017 (JP) .................................. 2017-048740

(51) Int. Cl.
*H04L 9/08* (2006.01)
*H04W 12/04* (2021.01)
(Continued)

(52) U.S. Cl.
CPC .......... *H04L 9/0819* (2013.01); *G06F 21/602* (2013.01); *H04L 9/0618* (2013.01);
(Continued)

(58) Field of Classification Search
CPC .... H04L 9/0819; H04W 12/003; H04W 12/04
(Continued)

(56) References Cited

U.S. PATENT DOCUMENTS 6,993,134 B1 * 1/2006 Epstein ................. H04L 9/0841
380/262
2010/0062714 A1 3/2010 Ozaki
(Continued)

FOREIGN PATENT DOCUMENTS

JP 2014068076 A 4/2014
JP 2016-001609 A 1/2016
(Continued)

OTHER PUBLICATIONS

Notice of Reasons for Refusal issued by the Japanese Patent Office in corresponding Japanese Patent Application No. 2017-048740, dated Nov. 24, 2020.

*Primary Examiner* — Peter C Shaw
(74) *Attorney, Agent, or Firm* — Arent Fox LLP

(57) ABSTRACT

A communication apparatus includes a storage device to store information indicating connection records of one or a plurality of terminals, and a processor. The processor performs a process including selecting one of a plurality of methods of exchanging a cipher key for communication with a target terminal that is to be connected to the communication apparatus, according to a combination of an input and output capability of the communication apparatus and an input and output capability of the target terminal, and
(Continued)

IO CAPABILITY OF GW

| | | Display Only (Type 1) (Input: None, Output: Only Numbers) | Display Yes No (Type 2) (Input: Yes/No Button, Keyboard, Output: Only Numbers) | Keyboard Only (Type 3) (Input: Keyboard, Output: None) | No Input No Output (Type 4) (Input: None, Yes/No Button, Output: None) |
|---|---|---|---|---|---|
| IO CAPABILITY OF DEVICE | Display Only (Type 1) (Input: None, Output: Only Numbers) | Just Works | Just Works※ | Passkey Entry | Just Works |
| | Display Yes No (Type 2) (Input: Yes/No Button, Keyboard, Output: Only Numbers) | Just Works※ | Numeric Comparison | Passkey Entry | Just Works※ |
| | Keyboard Only (Type 3) (Input: Keyboard, Output: None) | Passkey Entry | Passkey Entry | Passkey Entry | Just Works |
| | No Input No Output (Type 4) (Input: None, Yes/No Button, Output: None) | Just Works | Just Works※ | Just Works | Just Works |

※ Technically, automatic execution of numeric comparison, with no manual operations required, and substantially the same as "Just Works".

outputting the input and output capability of the communication apparatus that causes the combination to select a method that exchanges the cipher key with the target terminal when the information indicating the connection records of the target terminal is stored in the storage device.

19 Claims, 13 Drawing Sheets

(51) Int. Cl.
| | |
|---|---|
| H04L 9/06 | (2006.01) |
| G06F 21/60 | (2013.01) |
| H04W 88/02 | (2009.01) |
| H04W 4/38 | (2018.01) |
| H04W 12/00 | (2021.01) |
| H04W 4/80 | (2018.01) |

(52) U.S. Cl.
CPC ........... *H04W 4/38* (2018.02); *H04W 12/003* (2019.01); *H04W 12/04* (2013.01); *H04W 88/02* (2013.01); *H04L 2209/80* (2013.01); *H04W 4/80* (2018.02)

(58) Field of Classification Search
USPC ......................................... 380/255
See application file for complete search history.

(56) References Cited

U.S. PATENT DOCUMENTS

| | | | |
|---|---|---|---|
| 2011/0296186 A1* | 12/2011 | Wong | H04L 63/164 |
| | | | 713/171 |
| 2014/0155048 A1* | 6/2014 | Zawaideh | H04W 8/22 |
| | | | 455/418 |
| 2014/0170968 A1 | 6/2014 | Lovitt et al. | |
| 2014/0273845 A1 | 9/2014 | Russell et al. | |
| 2015/0223011 A1 | 8/2015 | Yato | |
| 2015/0350251 A1* | 12/2015 | Brander | G06F 16/955 |
| | | | 713/168 |
| 2017/0286134 A1* | 10/2017 | Sumiuchi | H04N 1/32797 |
| 2018/0241564 A1* | 8/2018 | Peterson | H04L 9/3236 |

FOREIGN PATENT DOCUMENTS

| | | |
|---|---|---|
| JP | 2016-127397 A | 7/2016 |
| WO | WO 2008/069299 A1 | 6/2008 |
| WO | WO 2014/097239 A2 | 6/2014 |

* cited by examiner

FIG.1

IO CAPABILITY OF GW

| | Display Only (Type 1) (Input: None, Output: Only Numbers) | Display Yes No (Type 2) (Input: Yes/No Button, Keyboard, Output: Only Numbers) | Keyboard Only (Type 3) (Input: Keyboard, Output: None) | No Input No Output (Type 4) (Input: None, Yes/No Button, Output: None) |
|---|---|---|---|---|
| Display Only (Type 1) (Input: None, Output: Only Numbers) | Just Works | Just Works※ | Passkey Entry | Just Works |
| Display Yes No (Type 2) (Input: Yes/No Button, Keyboard, Output: Only Numbers) | Just Works※ | Numeric Comparison | Passkey Entry | Just Works※ |
| Keyboard Only (Type 3) (Input: Keyboard, Output: None) | Passkey Entry | Passkey Entry | Passkey Entry | Just Works |
| No Input No Output (Type 4) (Input: None, Yes/No Button, Output: None) | Just Works | Just Works※ | Just Works | Just Works |

IO CAPABILITY OF DEVICE

※ Technically, automatic execution of numeric comparison, with no manual operations required, and substantially the same as "Just Works".

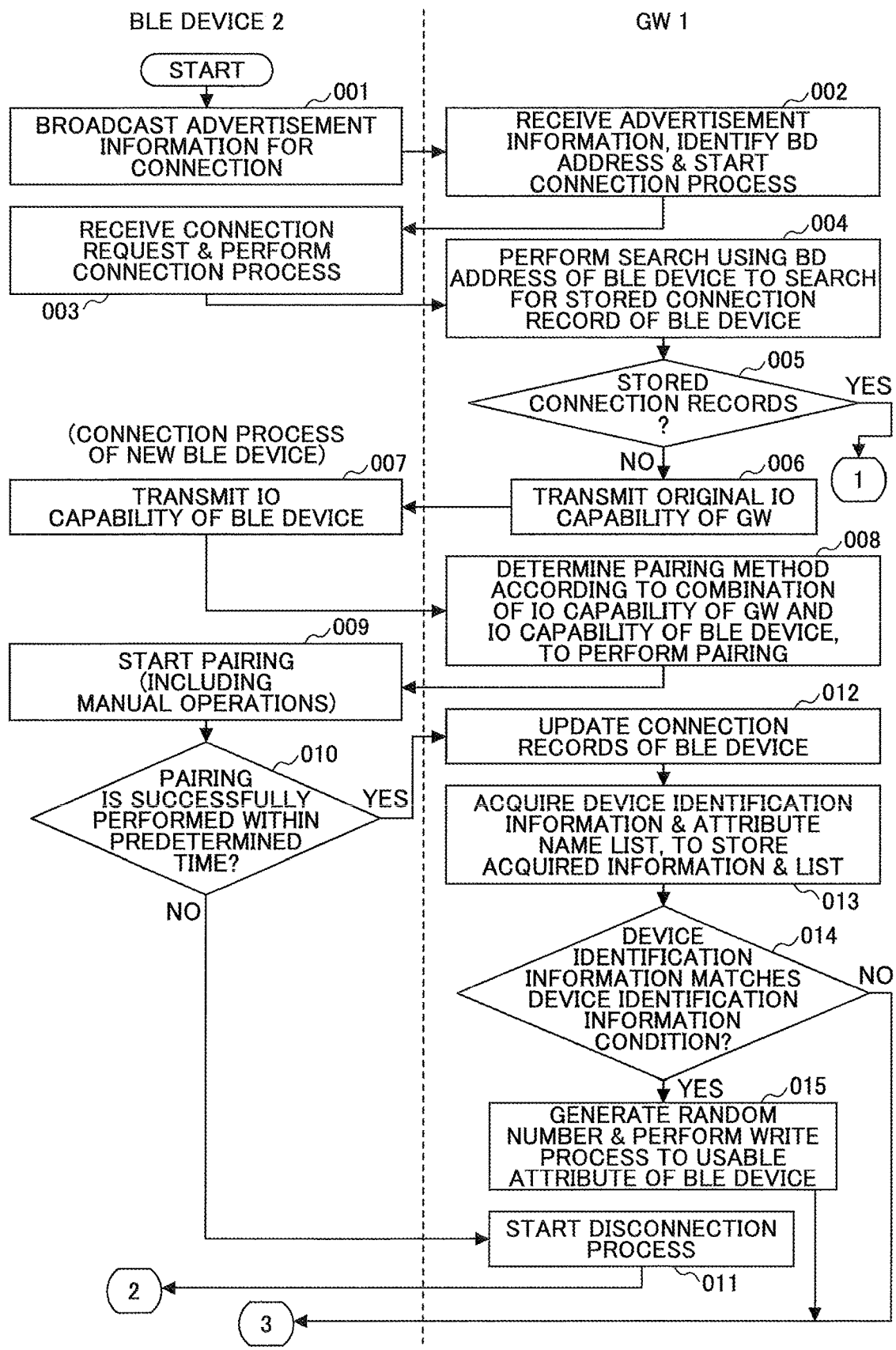

FIG.4

TABLE T1 FOR MANAGING CONNECTION RECORDS /T1

| BD ADDRESS | FINAL CONNECTION TIME |
|---|---|
| aa:aa:aa:aa:aa:aa | 2016/12/25 10:40:00.400 |
| bb:bb:bb:bb:bb:bb | 2016/12/25 11:50:10.800 |
| ... | ... |

FIG.5

TABLE T2 FOR MANAGING DEVICE INTERNAL INFORMATION /T2

| BD ADDRESS | DEVICE IDENTIFICATION INFORMATION | ATTRIBUTE NAME LIST | RANDOM NUMBER |
|---|---|---|---|
| aa:aa:aa:aa:aa:aa | Vendor ID = Vendor A<br>Product ID = XXX<br>Serial Number = X-123<br>... | ["Humidity", "Temperature Unit", "Collection Interval", "Transmission Interval", ...] | — |
| bb:bb:bb:bb:bb:bb | Vendor ID = Vendor B<br>Product ID = YYY<br>Serial Number = Y-456<br>... | ["Start of Operation", "End of Operation", "Set Temperature", ...] | Name = 12318927149827 |
| ... | ... | ... | ... |

FIG.6

TABLE T3 FOR MANAGING RANDOM NUMBER STORAGE ATTRIBUTE ~T3

| DEVICE IDENTIFICATION INFORMATION CONDITION | USABLE ATTRIBUTE NAME |
|---|---|
| Vendor ID = Vendor B && Product ID = YYY | Name |
| Vendor ID = Vendor C | Comment |
| ... | ... |

FIG.8

TABLE T4 FOR MANAGING DEVICE INTERNAL INFORMATION

| SENSING TIME | BD ADDRESS | SENSOR DATA |
|---|---|---|
| 2016/12/25 10:40:00.100 | aa:aa:aa:aa:aa:aa | [Temperature = 20.1, Humidity = 40] |
| 2016/12/25 10:40:10.99 | bb:bb:bb:bb:bb:bb | [Illuminance = 100] |
| 2016/12/25 10:40:20.110 | aa:aa:aa:aa:aa:aa | [Temperature = 20.2, Humidity = 39] |
| 2016/12/25 10:40:30.100 | bb:bb:bb:bb:bb:bb | [Illuminance = 150] |
| 2016/12/25 10:40:40.100 | aa:aa:aa:aa:aa:aa | [Temperature = 20.0, Humidity = 38] |
| ... | ... | ... |

COMMUNICATION APPARATUS, COMMUNICATION SYSTEM, AND COMMUNICATION CONTROL METHOD

CROSS-REFERENCE TO RELATED APPLICATIONS

This application is based upon and claims the benefit of priority of the prior Japanese Patent Application No. 2017-048740, filed on Mar. 14, 2017, the entire contents of which are incorporated herein by reference.

FIELD

The embodiments discussed herein are related to a communication apparatus, a communication system, a communication control method, and a computer-readable storage medium.

BACKGROUND

Recently, IoT (Internet of Things) services are becoming more popular. According to the IoT services, a large number of devices, sensors, or the like are connected to the Internet. The IoT services utilize large amounts of data collected from the devices, sensors, or the like. In some cases, a control command may be sent to the same devices or the others as a feedback of the collected data.

In many cases, the devices, sensors, or the like (hereinafter also referred to as "IoT devices") utilized by the IoT services are set up at locations where it is difficult to connect wirings to the IoT devices. In such cases, the IoT device, such as a terminal, may be powered by a battery. A communication technique increasingly employed by the terminal that is powered by the battery is short-range wireless communication having a low power consumption, such as BLE (BLUETOOTH (registered trademark) Low Energy).

There is a limit to a propagating distance of radio waves transmitted from the device communicating by BLE (hereinafter also referred to as "a BLE device"). In addition, the BLE device cannot communicate using IP (Internet Protocol). For these reasons, a network apparatus called a GW (Gate-Way) accommodates the BLE device, to mediate communications with the IoT services on the Internet.

For secure communication using the BLE, a cipher key exchange called "pairing", and a procedure to establish a master-slave relationship are performed. The pairing exchanges the cipher key between a master device, such as the GW, and a slave device, such as the terminal. A method called "bonding" stores the exchanged cipher key for use when the same connection is made again, to eliminate need for manual operations of a user to acquire the cipher key.

Related art may include Japanese National Publication of International Patent Application No. 2016-501609, International Publication Pamphlet No. WO 2008/069299, and Japanese Laid-Open Patent Publication No. 2016-127397.

Some BLE devices do not have bonding capability. When such BLE devices are disconnected from the GW, the pairing associated with reconnection to the GW is performed manually. However, depending on the set-up locations of the BLE devices, the manual pairing may be difficult or complicated.

SUMMARY

Accordingly, it is an object in one aspect of the embodiments to provide a communication apparatus, a communication system, a communication control method, and a computer-readable storage medium, which can facilitate key exchange associated with reconnection of a terminal.

According to one aspect of the embodiments, a communication apparatus includes a storage device configured to store information indicating connection records of one or a plurality of terminals, and a processor configured to perform a process including selecting one of a plurality of methods of exchanging a cipher key for communication with a target terminal that is to be connected to the communication apparatus, according to a combination of an input and output capability of the communication apparatus and an input and output capability of the target terminal, and outputting the input and output capability of the communication apparatus that causes the combination to select a method that exchanges the cipher key with the target terminal when the information indicating the connection records of the target terminal is stored in the storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram for explaining methods of selecting a pairing method;

FIGS. 3A and 3B are flow charts for explaining an example of operations in one embodiment;

FIG. 4 is a diagram illustrating an example of a data structure of a table T1 for managing connection records;

FIG. 5 is a diagram illustrating an example of a data structure of a table T2 for managing device internal information;

FIG. 6 is a diagram illustrating an example of a data structure of a table T3 for managing random number storage attribute;

FIG. 8 is a diagram illustrating an example of a data structure of a table T4 for managing device internal information;

DESCRIPTION OF EMBODIMENTS

Figure 2:
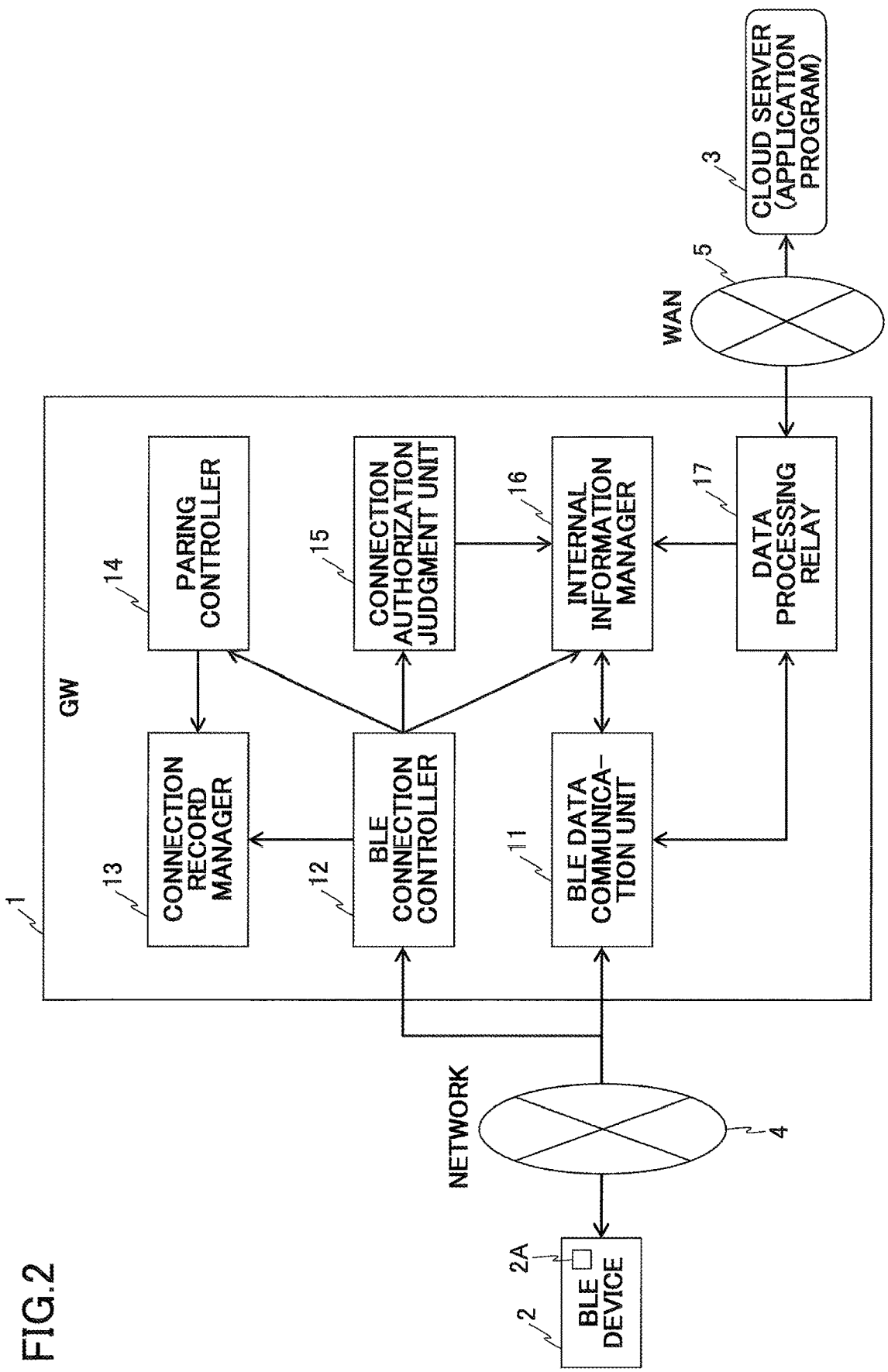
FIG. 2 is a block diagram illustrating an example of a configuration of a communication system in a first embodiment.

Preferred embodiments of the present invention will be described with reference to the accompanying drawings.

A description will now be given of a communication apparatus, a communication system, a communication control method, and a computer-readable storage medium in each embodiment according to the present invention.

As described above, for secure communication using the BLE, the cipher key exchange called "pairing", and the procedure to establish the master-slave relationship are performed. The pairing exchanges the cipher key between a master device, such as the GW, and a slave device, such as the terminal. For example, there are four kinds of pairing methods, that are examples of "a plurality of methods of exchanging the cipher key for communication with the terminal". The four kinds of pairing methods include "Just Works", "Passkey Entry", "Numeric Comparison", and "OOB (Out-Of-Band)". "OOB" confirms the cipher key exchange by communication other than BLUETOOTH (registered trademark), such as USB (Universal Serial Bus) and NFC (Near Field Communication). "Just Works" is an example of "a method of automatically exchanging the cipher key".

"Just Works" generates no user manipulation or operation when performing the pairing. Hence, "Just Works" automatically exchanges the cipher key without user intervention. "Passkey Entry" generates a user operation to input a 6-digit number passkey (or authentication code) when performing the pairing. "Numeric Comparison" generates a user operation to confirm display of identical information at both the slave device and the master device when performing the pairing. "OOB" generates a user operation to cause the GW to read the NFC attached to the device when performing the pairing.

In one embodiment, when connecting the slave device to the master device, such as the GW, the GW references connection records to judge whether the connection records exist, that is, whether the connection is a new connection or a reconnection. In a case in which the connection records exist and the connection is the reconnection, IO (Input and Output) capability (or IO capability information) that is presented to the slave device is controlled so that an appropriate pairing method is selected.

According to BLE specifications, the pairing method that is used when connecting the slave device and the master device, such as the GW, is determined by IO capabilities of the slave device and the master device. In other words, the GW presents a type of the IO capability of the GW itself to the slave device, and the slave device presents the type of the IO capability of the slave device itself to the GW. The GW selects (or determines) the pairing method according to a combination of the type of the IO capability of the slave device and the type of the IO capability of the GW.

FIG. 1 is a diagram for explaining methods of selecting the pairing method. FIG. 1 illustrates a table of the pairing methods determined by a corresponding relationship of the type of the IO capability of the GW and the type of the IO capability of the slave device. The corresponding relationship is an example of "a combination of the IO capability of the master device and the IO capability of the slave device", where the master device is a communication apparatus such as the GW, and the slave device is a terminal device.

The IO capability may be categorized into "Display Only (hereinafter also referred to as "Type 1")", "Display Yes No (hereinafter also referred to as "Type 2")", "Keyboard Only (hereinafter also referred to as "Type 3")", and "No Input No Output (hereinafter also referred to as "Type 4")". Type 1 includes no input capability, and outputs numbers by the output capability. Type 2 includes a Yes/No button or a keyboard as the input capability, and outputs numbers by the output capability. Type 3 includes a keyboard as the input capability, but includes no output capability. Type 4 includes no input capability or includes a Yes/No button, and includes no output capability.

In the table illustrated in FIG. 1, vertical columns indicate the IO capabilities (Type 1 to Type 4) of the GW, and horizontal rows indicate the IO capabilities (Type 1 to Type 4) of the device. For example, in a case in which the device is Type 1 and the GW is Type 1, Just Works is selected as the pairing method. In a case in which the device is Type 1 and the GW is Type 3, for example, Passkey Entry is selected as the pairing method. The pairing method is selected (or determined) in this manner according to a combination of the IO capability of the device (that is, the device type) and the IO capability of the GW (that is, the GW type).

In one embodiment, in a case in which the device is newly connected (that is, connected for the first time) to the GW, the GW presents the original IO capability of the GW to the device. In other words, the GW outputs the IO capability (or GW type) supported by the GW to the device.

On the other hand, in a case in which the device is reconnected (that is, connected again) to the GW, the GW presents the original IO capability "No Input No Output" of the GW to the device. In other words, the GW outputs the Type 4 supported by the GW to the device. Accordingly, in the case in which the device is reconnected to the GW, the pairing method "Just Works" that requires no manual operation is selected regardless of the GW type.

However, the pairing provided by the pairing method "Just Works" does not guarantee the corresponding relationship between a BD (BLUETOOTH (registered trademark) Device) address and the device that is actually connected. For this reason, a malicious third party may bring an unauthorized device with a stolen BD address to a location (or site) and connect the unauthorized device to the GW. Hence, information acquired from the device before reconnection to the GW is used to verify whether the reconnected device is identical to the original device originally connected to the GW. The device may be verified according to one of the following four verification methods, for example.

A first verification method vm1 performs the identity verification process using device-specific information of the device, that is an example of a static property. The first verification method vm1 uses Device Information Service of BLUETOOTH (registered trademark), so that the device-specific information of the device is provided to the GW. For example, the device-specific information may be a vendor ID (or manufacturer ID), a product ID (or model number), a serial number, or the like. In a case in which a value of the device-specific information provided by the reconnected device does not match the value of the device-specific information acquired from the original device prior to disconnection from the GW, the GW judges that the reconnected device is different from the original device originally connected to the GW.

A second verification method vm2 performs the identity verification process using an attribute name of BLE, that is another example of the static property. The second verification method vm2 uses the attribute name of BLE, represented by UUID (Universally Unique Identifier), for example, that is different for each device vendor, each device product, or the like. In a case in which the attribute name provided by the reconnected device does not match the attribute name acquired from the original device prior to disconnection from the GW, the GW judges that the reconnected device is different from the original device originally connected to the GW.

A third verification method vm3 performs the identity verification process using sensor data, that is an example of a dynamic property. The third verification method vm3 uses the sensor data that is an attribute value acquired from the device after the device is originally connected to the GW for the first time. The GW monitors the attribute value acquired from the device after the original connection, and computes an amount of change per unit time of the attribute value (or sensor data) that continuously changes. The attribute value (or sensor data) may be a value of attributes such as clock, temperature, humidity, pressure, position, or the like, for example. However, the attribute value is not limited to the value of such attributes. For example, the GW may compute a time from the disconnection of the device until the reconnection of the device. In a case in which an amount of change of the attribute value within the computed time does not fall within a range of the computed amount of change per unit time, the GW judges that the reconnected device is different from the original device originally connected to the GW. In other words, a disconnection process is performed to disconnect the reconnected device from the GW in the case in which the value of the sensor data acquired from the reconnected device (or terminal) falls outside a tolerable range of the change in the sensor data, obtained from a log of the sensor data. A combination of a plurality of attribute values may be used in a case in which the device includes a plurality of sensors.

A fourth verification method vm4 performs the identity verification process using written attribute, that is another example of the dynamic property. The fourth verification method vm4 is applied to a device to which the attribute value is writable. The GW may write a random number to the attribute value of the original device originally connected to the GW before the disconnection of the original device from the GW. After reconnecting the device to the GW, the GW checks whether the attribute value (or random number) read from the reconnected device matches the attribute value (or random number) written to the original device originally connected to the GW. In a case in which the attribute value read from the reconnected device does not match the attribute value written to the original device originally connected to the GW, the GW judges that the reconnected device is different from the original device originally connected to the GW.

At least one of the first through fourth verification methods vm1 through vm4 may be used to verify the device connected to the GW. In order to further improve the verification accuracy, it is possible to use a combination of the first and second verification methods vm1 and vm2, and to further use at least one of the third and fourth verification methods vm3 and vm4. Therefore, the GW can verify whether the reconnected device is identical to the original device originally connected to the GW, using at least one of the first through fourth verification methods vm1 through vm4. The GW disconnects the reconnected device when the GW judges that the reconnected device is different from the original device originally connected to the GW.

A malicious third party may steal the BD address by monitoring the BLE radio waves. However, the information used by the first through fourth verification methods vm1 through vm4 is internal information of the device, and is exchanged between the GW and the device by cryptocommunication. A third party is unable to acquire the internal information that is exchanged by cryptocommunication. Hence, it is possible to prevent the third party from connecting an unauthorized device to the GW.

First Embodiment

FIG. 2 is a block diagram illustrating an example of a configuration of a communication system in a first embodiment. The communication system illustrated in FIG. 2 includes a GW 1, and a BLE device 2 that makes BLE communication (or wireless communication) with the GW 1 by connecting to the GW 1 via a network 4. The GW 1 is connectable to a cloud server 3 via a WAN (Wide Area Network) 5. The GW 1 is an example of the communication apparatus forming the master device, while the BLE device 2 is an example of the terminal forming the slave device.

For example, the BLE device 2 includes a sensor part 2A having one or more sensors (not illustrated), and sensor data sensed by the one or more sensors are transmitted to the GW 1 by BLE communication. The cloud server 3 executes an application program to collect the sensor data. The application program provides an IoT service, for example, and the BLE device 2 may operate as an IoT device. The sensor data may be stored by the cloud server 3 and used for a desired purpose. The cloud server 3 may generate data based on the collected sensor data, and feed back the generated data to the BLE device 2.

The BLE device 2 does not have bonding capability. The bonding capability stores key information that is exchanged between the BLE device 2 and the GW 1 by the pairing, so that the stored key information can be used to reconnect the BLE device 2 to the GW 1. Hence, the bonding capability can avoid the need for manual operations of the user when reconnecting the BLE device 2 to the GW 1.

In a case in which the BLE device 2 is to be connected to the GW 1 for the first time, the GW 1 performs the pairing by the pairing method that is selected according to the combination of the type of IO capability of the GW 1 and the type of IO capability of the BLE device 2. On the other hand, in a case in which the BLE device 2 is to be reconnected, that is, is to be connected to the GW 1 for the second or subsequent times, the GW 1 decides the IO capability of the GW 1 to be presented to the BLE device 2.

In other words, the GW 1 presents to the BLE device 2 Type 4 (No Input No Output) of the IO capability of the GW 1 that exchanges the internal information with the BLE device 2. Hence, "Just Works", that requires no manual operation, is selected as the pairing method when reconnecting the BLE device 2 to the GW 1. Further, the GW 1 uses the internal information of the BLE device 2 to verify that the BLE device 2 to be reconnected to the GW 1 is identical to the original BLE device 2 originally connected to the GW 1.

The GW 1 includes a BLE data communication unit 11, a BLE connection controller 12, a connection record manager 13, a pairing controller 14, a connection authorization judgment unit 15, an internal information manager 16, and a data processing relay 17.

The BLE data communication unit 11 performs a data communication process in accordance with the BLE specifications, to communicate with the BLE device 2. The BLE connection controller 12 performs processes in accordance with the BLE specifications, including a scan process to scan and detect the BLE device 2, a connection process to connect to the detected BLE device 2, or the like. The connection record manager 13 stores connection records including the BD address of the BLE device 2 that is actually connected to the GW 1 by BLE connection, and judges whether the BLE device 2 connected to the GW 1 has been connected to the GW 1 in the past. In other words, the connection record manager 13 judges whether the BLE device 2 is newly connected or reconnected to the GW 1.

The pairing controller 14 determines the pairing method according to the connection records of the BLE device 2, and performs a pairing process by the determined pairing method. The connection authorization judgment unit 15 judges whether to authorize the connection of the BLE device 2 to the GW 1, using the internal information of the BLE device 2 acquired from the BLE device 2. The internal information manager 16 stores the acquired internal information of the BLE device 2. The stored internal information of the BLE device 2 is used to judge whether to authorize the connection of the BLE device 2 to the GW 1 when reconnecting the BLE device 2 to the GW 1. The data processing relay 17 performs processes including a process to transmit the data acquired from the BLE device 2 to the application program of the cloud server 3, a process to transmit a control instruction from the application program of the cloud server 3 to the BLE device 2, or the like.

<Example of Operations>

Figure 3B:
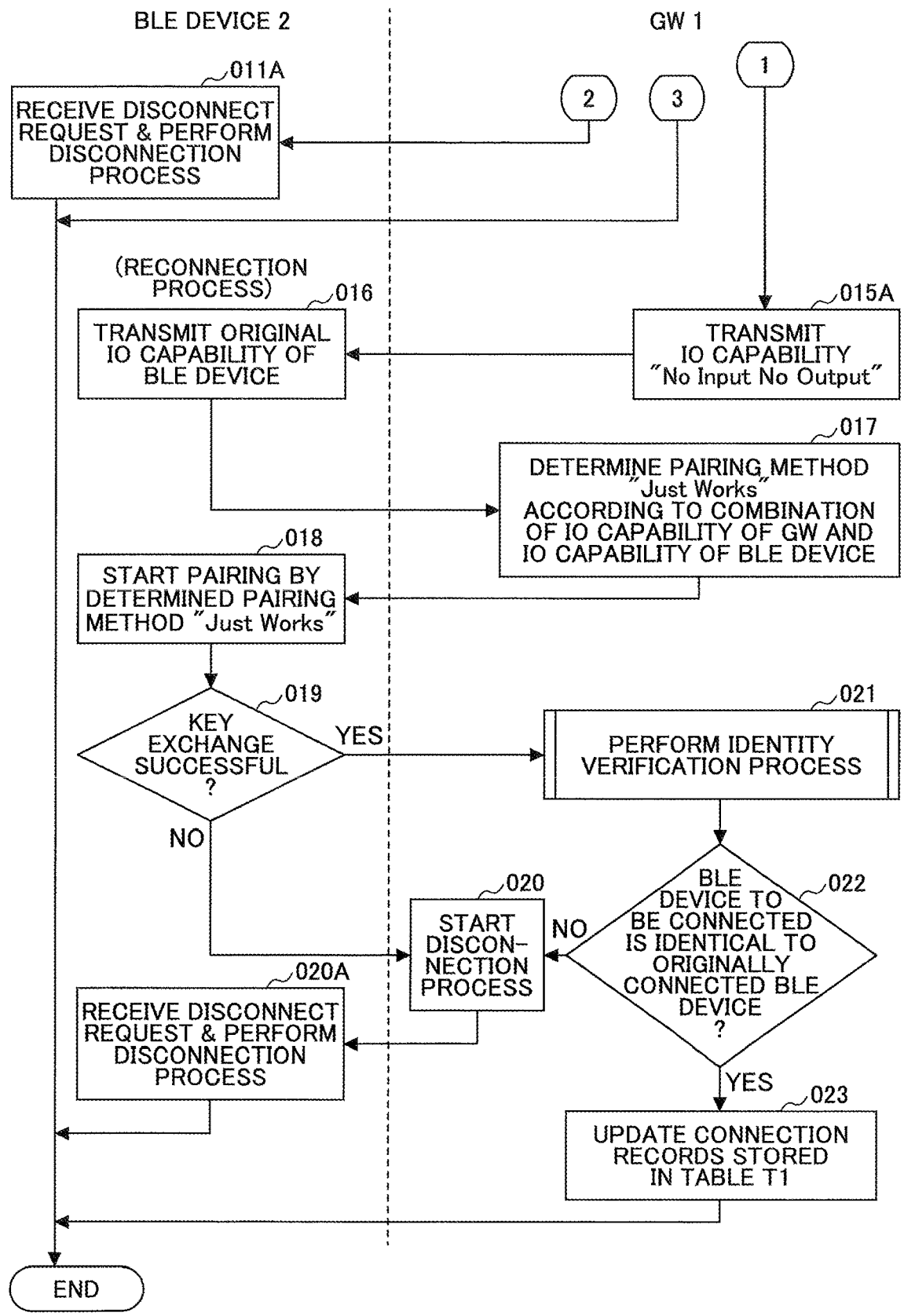

An example of the operations of the BLE device 2 and the GW 1, when connecting the BLE device 2 to the GW 1, will be described. FIGS. 3A and 3B are flow charts for explaining an example of the operations in one embodiment. The BLE device 2 connected to the GW 1 may be rebooted, when the BLE device 2 is once disconnected from the GW 1 and thereafter reconnected to the GW 1 for the purposes of performing a refresh process or the like, for example. On the other hand, the BLE device 2 may be newly connected to the GW 1. In such cases, in step 001 illustrated in FIG. 3A, the BLE device 2 broadcasts advertisement information (or advertisement message) for connection.

In step 002, the BLE connection controller 12 of the GW 1 receives the advertisement information from the BLE device 2, identifies the BD address of the BLE device 2 included in the advertisement information, and starts a connection process by transmitting a connection request specifying the identified BD address of the BLE device 2 to this BLE device 2.

In step 003, the BLE device 2 receives the connection request from the GW 1, and performs the connection process with respect to the GW 1 in response to detecting that the BD address specified by the connection request is the BD address of the BLE device 2. When a link connection is established between the BLE device 2 and the GW 1, the BLE connection controller 12 of the GW 1 inquires the connection record manager 13 whether the BLE device 2 has previously been connected to the GW 1 in the past.

The connection record manager 13 uses a table T1 for managing connection records, to manage a final connection time of BLE devices connected to the GW 1, including the BLE device 2. FIG. 4 is a diagram illustrating an example of a data structure of the table T1 for managing connection records. The table T1 stores the final connection time corresponding to the BD address of each of the BLE devices, including the BLE device 2. The BD address is an identifier for each of the BLE devices, including the BLE device 2. The final connection time indicates a time when each of the BLE devices, including the BLE device 2, was last connected to the GW 1.

In step 004, the connection record manager 13 of the GW 1 performs a search using the BD address of the BLE device 2 stored in the table T1, to search for a stored connection record of the BLE device 2. In step 005, the connection record manager 13 of the GW 1 judges whether the stored connection record of the BLE device 2 exists, by judging whether the table T1 stores the BD address of the BLE device 2. However, even if the table T1 stores the BD address of the BLE device 2, the connection record manager 13 may judge that no stored connection record of the BLE device 2 exists in a case in which an elapsed time from the last connection time of the BLE device 2 exceeds a threshold value. The reason is that the BLE device 2 may be replaced with a malicious device replicated by a wicked person for a long time.

In the case in which the connection record manager 13 of the GW 1 judges that no stored connection record of the BLE device 2 exists and a judgment result in step 005 is NO, the connection process for a new device is executed. In other words, in step 006, the BLE connection controller 12 of the GW 1 transmits the original IO capability (or IO capability information) of the GW 1 to the BLE device 2. In step 007, the BLE device 2 that receives the IO capability of the GW 1 likewise transmits the IO capability (or IO capability information) of the BLE device 2 to the GW 1.

The BLE connection controller 12 of the GW 1 receives the IO capability of the BLE device 2. In step 008, the pairing controller 14 of the GW 1 determines the pairing method according to the combination of the IO capability of the GW 1 and the IO capability of the BLE device 2, that is, the combination of the types of IO capabilities of the GW 1 and the BLE device 2, in order to perform the pairing by the determined pairing method. In step 009, the BLE device 2 starts the pairing by the determined pairing method. In this case, because the BLE device 2 is being newly connected to the GW 1, the GW 1 determines the pairing method according to the table illustrated in FIG. 1, for example, using the original IO capability of the GW 1. Alternatively, the GW 1 may determine the pairing method to one of "Passkey Entry", "Numeric Comparison", and "COB" that require manual operations of the user, according to a method other than the method that uses the table illustrated in FIG. 1.

The pairing controller 14 of the GW 1 exchanges the key information for cryptocommunication with the BLE device 2 by the pairing, and secures a safe communication method. In step 010, the BLE device 2 judges whether the pairing is successfully performed within a predetermined time. In a case in which the pairing takes too much time and is not successfully performed within the predetermined time, a judgment result in step 010 is NO. When the judgment result in step 010 is NO and a time-out of the predetermined time occurs, the process advances to step 011 and then to step 011A illustrated in FIG. 3B, to perform a disconnection process to disconnect the BLE device 2 from the GW 1 due to pairing failure. For example, in step 011, the BLE connection controller 12 of the GW 1 may start the disconnection process by transmitting a disconnect request specifying the identified BD address of the BLE device 2 to this BLE device 2. In step 011A, the BLE device 2 receives the disconnect request from the GW 1, and performs the disconnection process with respect to the GW 1 in response to detecting that the BD address specified by the disconnect request is the BD address of the BLE device 2. The process ends after step 011A, as illustrated in FIG. 3B. Hence, the link connection established between the BLE device 2 and the GW 1 is canceled or released. The disconnection process may also be performed in a case in which an unauthorized input of information is made when performing the pairing.

On the other hand, in a case in which the pairing is successfully performed within the predetermined time and the judgment result in step 010 is YES, the process advances to step 012. In step 012, the connection record manager 13 of the GW 1 updates the connection records of the BLE device 2 in the table T1. In other words, the connection record manager 13 stores the DB address and the final connection time of the BLE device 2 in the table T1.

The internal information manager 16 of the GW 1 acquires (or receives), via the BLE data communication unit 11, the device-specific information of the BLE device 2 by DIS (Device Information Service), and an attribute name list, from the BLE device 2, and stores the acquired (or received) device-specific information of the BLE device 2 and the attribute name list. The internal information manager 16 manages the internal information (hereinafter also referred to as "device internal information") of the BLE device 2 using a table T2 for managing device internal information.

FIG. 5 is a diagram illustrating an example of a data structure of the table T2 for managing device internal information. The table T2 illustrated in FIG. 5 is formed by entries to device identification information, an attribute name list, and a random number respectively corresponding to the BD address of each of the BLE devices, including the BLE device 2. The BD address is the identifier for each of the BLE devices, including the BLE device 2. The device identification information is the device-specific information of each of the BLE devices, including the BLE device 2, and may be a vendor ID (or manufacturer ID), a product ID (or model number), a serial number, or the like of the BLE device. The attribute name list is a list of attribute names usable for the identity verification. The UUID may be used as the attribute name. The random number is the random number used by the fourth verification method vm4.

In step 013, the internal information manager 16 of the GW 1 acquires the device identification information and the attribute name list from the BLE device 2, and stores the acquired device identification information and the attribute name list in the table T2. The internal information manager 16 further manages a table T3 for managing random number storage attribute.

FIG. 6 is a diagram illustrating an example of a data structure of the table T3 for managing the random number storage attribute. The table T3 illustrated in FIG. 6 is formed by one or more entries registered with device identification information condition and a usable attribute name. The device identification information condition is a condition related to the device identification information, restricting a target device. The usable attribute name indicates a name (or item) of the attribute for which a value may be written from outside the BLE device 2. In a case in which the device identification information includes the vendor ID, the product ID, or the like of the BLE device registered in the table T3, a random number is written to the corresponding usable attribute name of the BLE device 2.

In step 014, the internal information manager 16 of the GW 1 judges whether the device identification information matches the device identification information condition stored in the table T3. When a judgment result in step 014 is YES, the process advances to step 015. In step 015, the internal information manager 16 of the GW 1 generates a random number, and performs a write process to write the random number into the usable attribute name of the BLE device 2 in the table T3. The write process writes the random number in the BLE device 2, as the attribute information. The value of the random number is also written in the "random number" of the corresponding entry of the table T2 illustrated in FIG. 5. Registered contents of the table T3 may be prepared in advance. The writing of the random number with respect to the BLE device 2 may be performed immediately before rebooting the BLE device 2 from the GW 1.

After step 015, or when the judgment result in step 014 is NO, the process ends, as illustrated in FIG. 3B.

When the judgment result in step 005 is YES, the process advances to step 015A illustrated in FIG. 3B. In step 015A, the BLE connection controller 12 of the GW 1 transmits (or outputs) to the BLE device 2 the IO capability "No Input No Output", that is, Type 4, regardless of the original IO capability of the GW 1. In step 016, the BLE device 2 transmits the original IO capability of the BLE device 2 to the GW 1.

In step 017, the pairing controller 14 of the GW 1 determines the pairing method according to the combination of the IO capability of the GW 1 and the IO capability of the BLE device 2, that is, the combination of the types of IO capabilities of the GW 1 and the BLE device 2, in order to perform the pairing by the determined pairing method. Because the IO capability of the GW 1 is "No Input No Output", that is, Type 4, the pairing controller 14 determines "Just Works" as the pairing method. In step 018, the BLE device 2 starts the pairing by the determined pairing method "Just Works". The pairing method "Just Works" does not require manual operations of the user when reconnecting the BLE device 2 to the GW 1. For this reason, the key exchange is automatically performed between the GW 1 and the BLE device 2.

In step 019, the BLE device 2 judges whether the key exchange, that is, the pairing, is successful. When the key exchange fails due to radio interference or the like and a judgment result in step 019 is NO, the process advances to step 020 and then to step 020A, to perform a disconnection process to disconnect the BLE device 2 from the GW 1 due to pairing failure. For example, in step 020, the BLE connection controller 12 of the GW 1 may start the disconnection process by transmitting a disconnect request specifying the identified BD address of the BLE device 2 to this BLE device 2. In step 020A, the BLE device 2 receives the disconnect request from the GW 1, and performs the disconnection process with respect to the GW 1 in response to detecting that the BD address specified by the disconnect request is the BD address of the BLE device 2. The process ends after step 020A, as illustrated in FIG. 3B. Hence, the link connection established between the BLE device 2 and the GW 1 is canceled or released.

On the other hand, when the key exchange is successful, that is, the pairing is successful, and the judgment result in step 019 is YES, the process advances to step 021. In step 021, the connection authorization judgment unit 15 of the GW 1 uses the internal information of the BLE device 2 managed by the internal information manager 16, to perform an identify verification process. The identity verification process verifies whether the BLE device 2 that is to be connected to the GW 1 by the connection process is identical to the original BLE device 2 that was originally connected to the GW 1 before being disconnected from the GW 1.

In step 022, the connection authorization judgment unit 15 of the GW 1 judges whether the identify verification process verified that, the BLE device 2 that is to be connected to the GW 1, is identical to the original BLE device 2 originally connected to the GW 1. When a judgment result in step 022 is NO, the process advances to step 020 and then to step 020A described above, to perform the disconnection process. On the other hand, when the judgment result in step 022 is YES, the process advances to step 023. In step 023, the connection between the GW 1 and the BLE device 2 is maintained, and the connection record manager 13 of the GW 1 updates the connection records stored in the table T1 illustrated in FIG. 4.

Figure 7A:
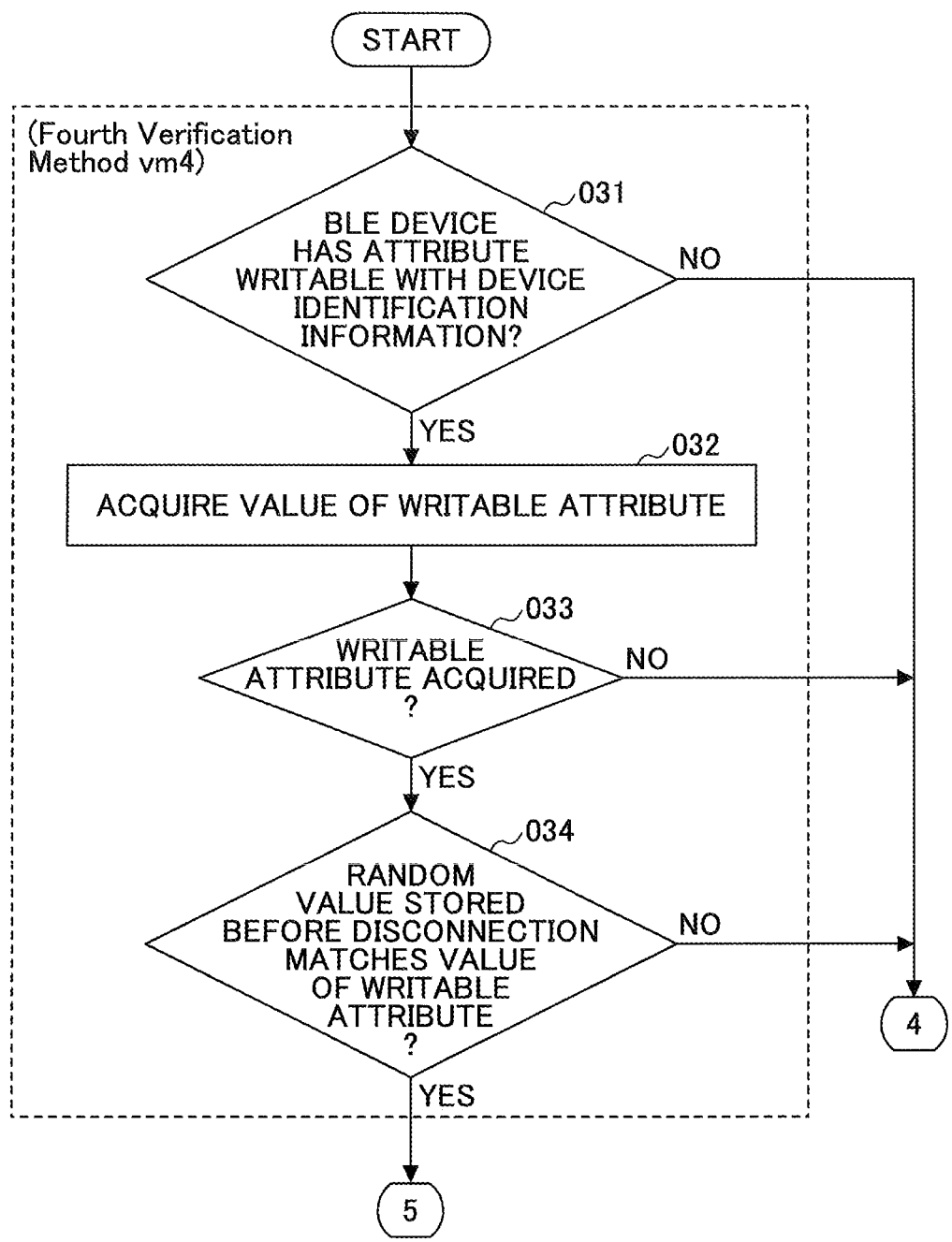
FIGS. 7A and 7B are flow charts for explaining an example of a subroutine of an identity verification process.
Figure 7B:
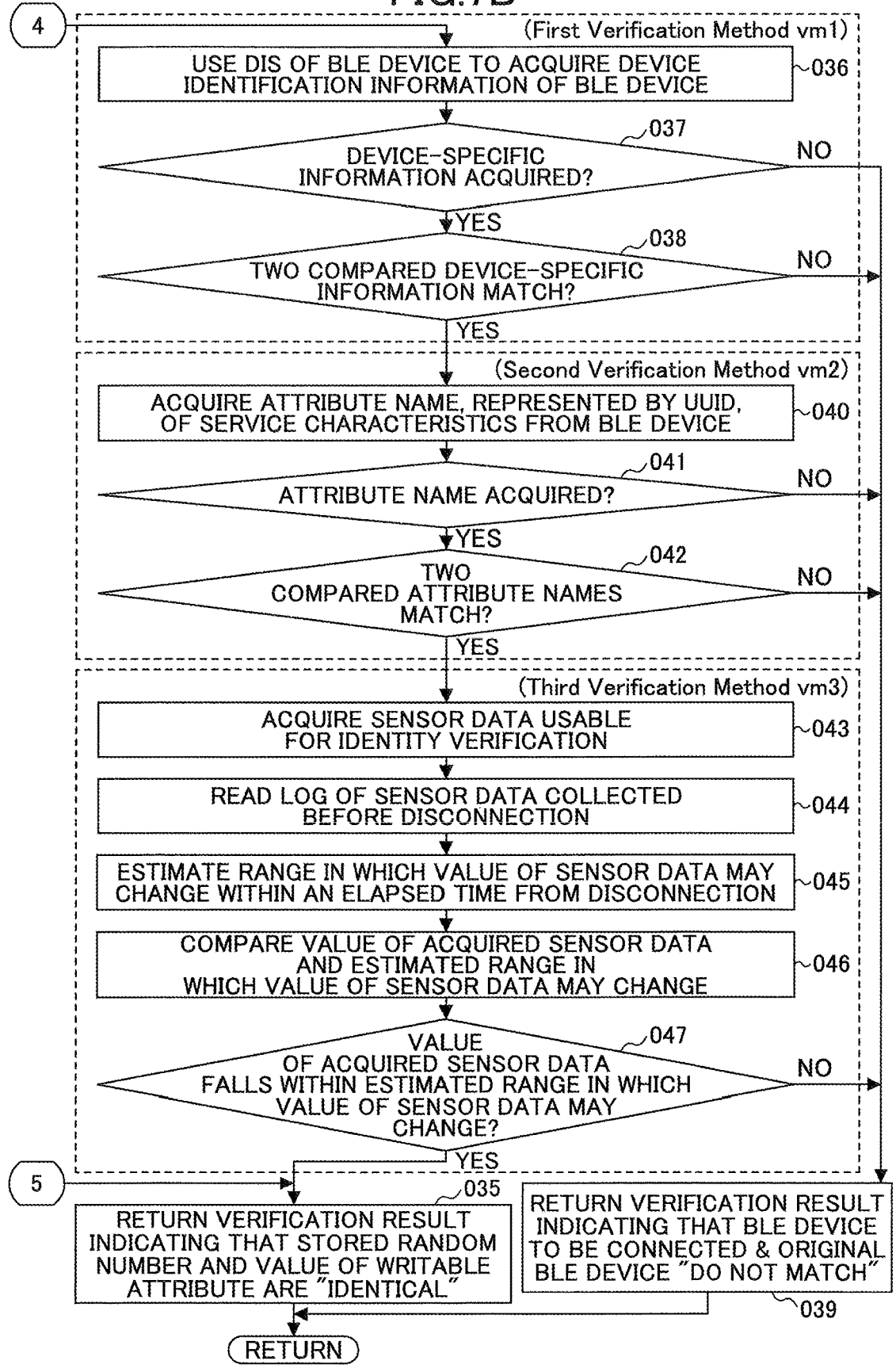

FIGS. 7A and 7B are flow charts for explaining an example of a subroutine of the identity verification process of step 021 illustrated in FIG. 3B. First, the connection authorization judgment unit 15 of the GW 1 performs the identity verification process using the fourth verification method vm4, among the first through fourth verification methods vm1 through vm4 described above, as indicated by steps 031 through 034 surrounded by dotted lines in FIG. 7A.

In step 031 illustrated in FIG. 7A, the connection authorization judgment unit 15 of the GW 1 judges whether the BLE device 2 has an attribute writable with the device identification information. In this example, the device identification information is the random number.

When the BLE device 2 does not have a writable attribute and a judgment result in step 031 is NO, the identity verification process is performed using verification methods other than the fourth verification method vm4. In this example, the process advances to step 036 illustrated in FIG. 7B that will be described later. On the other hand, when the BLE device 2 has the writable attribute and the judgment result in step 031 is YES, the process advances to step 032. In step 032, the connection authorization judgment unit 15 of the GW 1 acquires the value of the writable attribute from the BLE device 2.

In step 033, the connection authorization judgment unit 15 of the GW 1 judges whether the value of the writable attribute is acquired from the BLE device 2. When a judgment result in step 033 is YES, the process advances to step 034. In step 034, the connection authorization judgment unit 15 of the GW 1 judges whether the random number stored before the disconnection of the BLE device 2 from the GW 1 matches the value of the writable attribute.

When the stored random number and the value of the writable attribute match and a judgment result in step 034 is YES, the process advances to step 035 illustrated in FIG. 7B. In step 035, the connection authorization judgment unit 15 of the GW 1 returns a verification result indicating that the stored random number and the value of the writable attribute are "identical", and the subroutine process ends to return the process to step 022 illustrated in FIG. 3B. In other words, the connection authorization judgment unit 15 of the GW 1 returns a verification result indicating that the BLE device 2 to be connected to the GW 1 and the original BLE device 2 originally connected to the GW 1 are "identical". On the other hand, when the acquisition of the attribute value fails and the judgment result in step 033 is NO, or when the stored random number and the value of the writable attribute do not match and the judgment result in step 034 is NO, the identity verification process is performed using the verification method other than the fourth verification method vm4. In this example, the process advances to step 036 illustrated in FIG. 7B. More particularly, the connection authorization judgment unit 15 of the GW 1 performs the identity verification process using the first verification method vm1, as indicated by steps 036 through 038 surrounded by dotted lines in FIG. 7B, or using the second verification method vm2, as indicated by steps 040 through 042 surrounded by dotted lines in FIG. 7B, or using the third verification method vm3, as indicated by steps 043 through 047 surrounded by dotted lines in FIG. 7B.

In step 036, the connection authorization judgment unit 15 of the GW 1 starts the first verification method vm1 by using the DIS of the BLE device 2 to acquire the device identification information stored in the BLE device 2. The stored device identification information may be the device-specific information formed by at least one of the vendor ID, the product ID, and the serial number of the BLE device 2, for example.

In step 037, the connection authorization judgment unit 15 judges whether the device identification information is acquired. When the device identification information is acquired and the judgment result in step 037 is YES, the process advances to step 038. In step 038, the connection authorization judgment unit 15 of the GW 1 compares the acquired device identification information and the device identification information managed by the internal information manager 16, to judge whether the two compared device identification information match. The process advances to step 040 when a judgment result in step 038 is YES. On the other hand, when the acquisition of the device identification information fails and the judgment result in step 037 is NO, or when the two compared device identification information do not match and the judgment result in step 038 is NO, the process advances to step 039. In step 039, the connection authorization judgment unit 15 of the GW 1 returns a verification result indicating that the BLE device 2 to be connected to the GW 1 and the original BLE device 2 originally connected to the GW 1 before being disconnected from the GW 1 "do not match", and the subroutine process ends, to return the process to step 022 illustrated in FIG. 3B.

In step 040, the connection authorization judgment unit 15 of the GW 1 starts the second verification method vm2 by acquiring the attribute names (represented by UUID, for example) of service characteristics from the BLE device 2.

In step 041, the connection authorization judgment unit 15 of the GW 1 judges whether the attribute name is acquired. When the attribute name is acquired and a judgment result in step 041 is YES, the process advances to step 042. In step 042, the connection authorization judgment unit 15 of the GW 1 compares the acquired attribute name and the information including the attribute name managed by the internal information manager 16, to judge whether the two compared attribute names match. When the two compared attribute names match and a judgment result in step 042 is YES, the process advances to step 043 to start the third verification method vm3.

When the acquisition of the attribute name fails and the judgment result in step 041 is NO, or when the two compared attribute names do not match and the judgment result in step 042 is NO, the process advances to step 039. In step 039, the connection authorization judgment unit 15 returns a verification result indicating that the BLE device 2 to be connected to the GW 1 and the original BLE device 2 originally connected to the GW 1 before being disconnected from the GW 1 "do not match", and the subroutine process ends, to return the process to step 022 illustrated in FIG. 3B. In order to reduce battery power consumption of the BLE device 2, it is possible to use the name (represented by UUID, for example) of the service characteristics, in place of the attribute name.

In step 043, the connection authorization judgment unit 15 of the GW 1 starts the third verification method vm3 by acquiring from the BLE device 2 the sensor data usable for the identity verification. In step 044, the connection authorization judgment unit 15 of the GW 1 reads the log of the sensor data collected before the disconnection of the BLE device 2 from the GW 1. In step 045, the connection authorization judgment unit 15 of the GW 1 estimates a range in which the value of the sensor data may change within an elapsed time from the disconnection of the BLE device 2 from the GW 1. In step 046, the connection authorization judgment unit 15 of the GW 1 compares the value of the acquired sensor data and the estimated range in which the value of the sensor data may change. In step 047, the connection authorization judgment unit 15 of the GW 1 judges whether the value of the acquired sensor data falls within the estimated range in which the value of the sensor data may change. In other words, a judgment is made to determine whether a difference between the last acquired sensor data and the acquired sensor data falls within a range of a predetermined amount of change obtained from the log of the sensor data.

When the acquired sensor data falls within the estimated range and a judgment result in step 047 is YES, the process advances to step 035. In step 035, the connection authorization judgment unit 15 of the GW 1 returns a verification result indicating that the BLE device 2 to be connected and the original BLE device 2 originally connected to the GW 1 are "identical", and the subroutine process ends, to return the process to step 022 illustrated in FIG. 3B. On the other hand, when the acquired sensor data does not fall within the estimated range and the judgment result in step 047 is NO, the process advances to step 039. In step 039, the connection authorization judgment unit 15 of the GW 1 returns a verification result indicating that the BLE device 2 to be connected to the GW 1 and the original BLE device 2 originally connected to the GW 1 before being disconnected from the GW 1 "do not match", and the subroutine process ends, to return the process to step 022 illustrated in FIG. 3B.

The log of the sensor data used by the third verification method vm3 is acquired when the application program of the cloud server 3 acquires the sensor data from the BLE device 2, or when the BLE device 2 transmits the sensor data to the application program of the cloud server 3. In other words, the data processing relay 17 of the GW 1 acquires the sensor data via the BLE data communication unit 11, and stores the acquired sensor data in a table T4 for managing device internal information, managed by the internal information manager 16.

FIG. 8 is a diagram illustrating an example of a data structure of the table T4 for managing the device internal information. The table T4 is formed by sets of entries respectively storing a sensing time, a BD addresses, and the sensor data. An aggregate of the sets of entries forms the log.

The example of the subroutine of the identity verification process illustrated in FIGS. 7A and 7B is described above for the case in which all of the first through fourth verification methods vm1 through vm4 are used. However, it is possible to appropriately set the number of verification methods to be used and the order in which the verification methods are to be used, among the first through fourth verification methods vm1 through vm4. For example, in a case in which the BLE device is a device, such as an actuator, that controls a target, the BLE device 2 (or actuator) may hardly carry out sensing. In such a case, it is possible not to use the third verification method vm3, but to use the first and second verification methods vm1 and vm2. In addition, in a case in which all of the BLE devices 2 installed at a location (or site) have the writable attribute, it is possible to use the fourth verification method vm4 among the first through fourth verification methods vm1 through vm4.

<<Hardware Configuration>>

Figure 9:
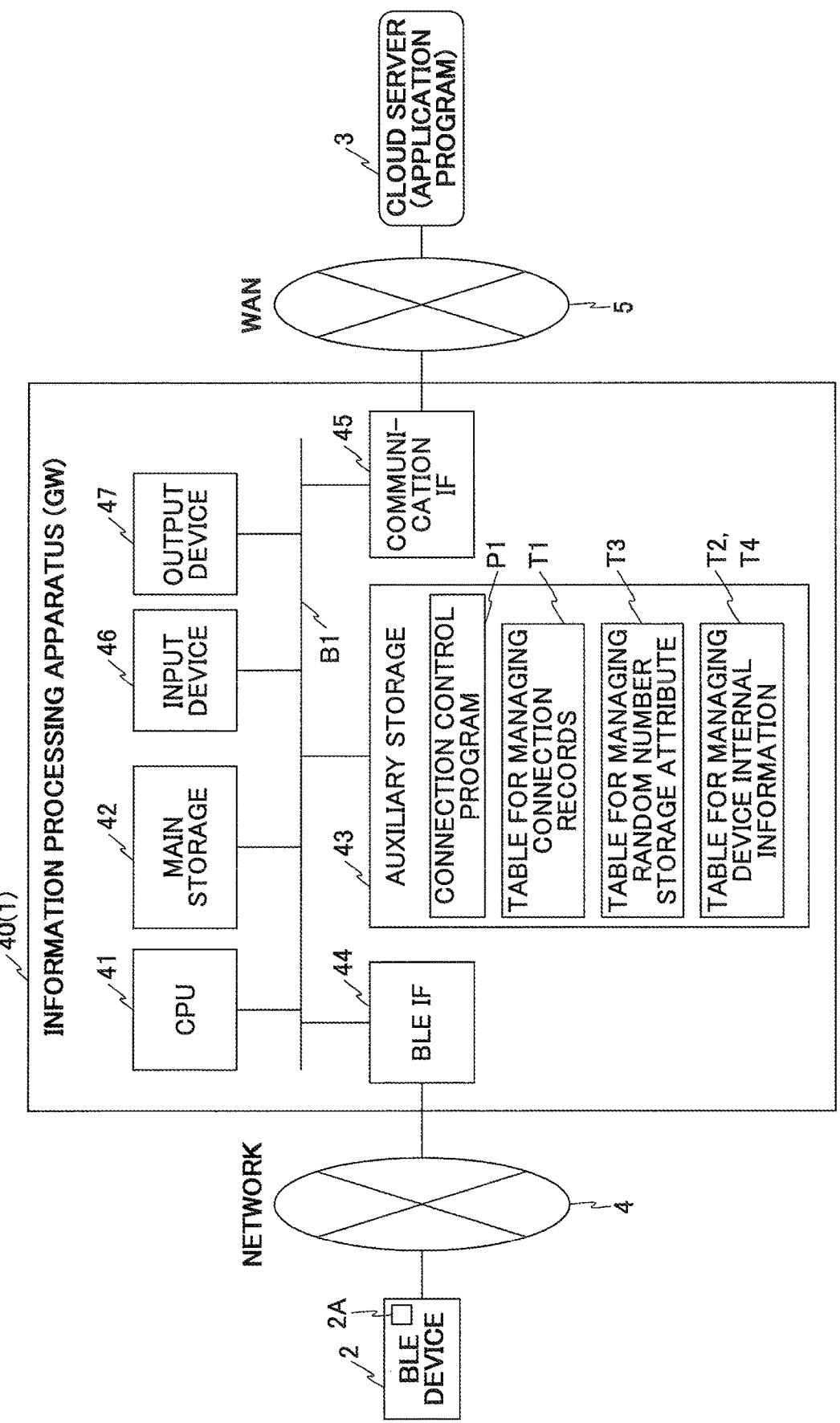
FIG. 9 is a block diagram illustrating an example of a hardware configuration of an information processing apparatus (or computer) applicable to a gateway.

FIG. 9 is a block diagram illustrating an example of a hardware configuration of an information processing apparatus (or computer) 40 applicable to the GW 1. In this example, the information processing apparatus 40 includes a CPU (Central Processing Unit) 41, a main storage 42, and an auxiliary (or secondary) storage 43 that are mutually connected via a bus B1. The information processing apparatus 40 further includes a BLE IF (Interface) 44, a communication IF (Interface) 45, an input device 46, and an output device 47.

The main storage 42 includes a work area for the CPU 41, a storage area for the data and programs, a buffer area for communication data, or the like. The main storage 42 may be formed by a RAM (Random Access Memory), or a combination of the RAM and a ROM (Read Only Memory), for example.

The auxiliary storage 43 includes a storage area that stores the data and the programs. The auxiliary storage 43 may be formed by a nonvolatile memory such as a HDD (Hard Disk Drive), a SSD (Solid State Drive), a flash memory, an EEPROM (Electrically Erasable Programmable Read Only Memory), or the like, for example. Each of the main storage 42 and the auxiliary storage 43 is an example of any one of a storage device, a recording medium, a memory, and a storage. The recording medium may be formed by a non-transitory computer-readable storage medium.

The BLE IF 44 is an example of a communication circuit that supports BLE. The BLE IF 44 is communicable with the BLE device 2 via the network 4. The communication IF 45 performs a communication process. For example, a NIC (Network Interface Card) may be used for the communication IF 45. The communication IF 45 is communicable with the cloud server 3 via the WAN 5. The input device 46 may be formed by keys, buttons, a pointing device such as a mouse, a touchscreen panel, an audio input device (for example, a microphone), or the like. The output device 47 may be formed by a display, the touchscreen panel, or the like. The output device 47 may include a printer, a speaker, a lamp, or the like.

The CPU 41 loads the program stored in at least one of the main storage 42 and the auxiliary storage 43, to the main storage 42 to execute the loaded program. The information processing apparatus 40 performs the operation of the GW 1 by executing the program loaded to the main storage 42.

At least one of the main storage 42 and the auxiliary storage 43 (the auxiliary storage 43 in the case of the example illustrated in FIG. 9) stores a connection control program P1 for performing the processes described above in conjunction with FIGS. 3A, 3B, 7A, and 7B. In addition, at least one of the main storage 42 and the auxiliary storage 43 (the auxiliary storage 43 in the case of the example illustrated in FIG. 9) stores the table T1 illustrated in FIG. 4, the table T2 illustrated in FIG. 5, the table T3 illustrated in FIG. 6, and the table T4 illustrated in FIG. 8.

The CPU 41 can execute the connection control program P1 to perform the operations of the BLE data communication unit 11, the BLE connection controller 12, the connection record manager 13, the pairing controller 14, the connection authorization judgment unit 15, the internal information manager 16, and the data processing relay 17. In this case, the CPU 41 performs the processes of the GW 1 illustrated in FIGS. 3A, 3B, 7A, and 7B.

The CPU 41 is an example of any one of a control apparatus, a control device, and a controller. The CPU 41 may be formed by a processor, such as a MPU (Micro-Processing Unit). The CPU 41 may have a single-processor configuration or a multi-processor configuration. In addition, a single CPU connected by a single socket may have a multi-core configuration. At least a part of the processes performed by the CPU 41 may be performed by a multi-core CPU or a plurality of CPUs. Further, at least a part of the processes performed by the CPU 41 may be performed by a special purpose processor (or dedicated processor) other than the CPU 41, such as a DSP (Digital Signal Processor), a GPU (Graphics Processing Unit), a numerical processor, a vector processor, an image processor, or the like, for example.

At least a part of the processes performed by the CPU 41 may be performed by an IC (Integrated Circuit), or other digital circuits. The IC or the digital circuits may include an analog circuit. The IC includes a LSI (Large Scaled Integrated circuit), an ASIC (Application Specific Integrated Circuit), a PLD (Programmable Logic Device), or the like, for example. For example, the PLD includes a FPGA (Field Programmable Gate Array). At least a part of the processes performed by the CPU 41 may be performed by a combination of the processor and the IC. Such a combination may be referred to as a MCU (Micro Control Unit), a SoC (System-on-a-Chip), a system LSI, or a chip set.

The BLE device 2 includes at least a CPU, a main storage, an auxiliary storage, and a BLE IF that are similar to the CPU 41, the main storage 42, the auxiliary storage 43, and the BLE IF 44 of the information processing apparatus 40, respectively. In addition, the BLE device 2 may include a sensor part having one or more sensors for obtaining the sensor data, that is similar to the sensor part 2A. The CPU of the BLE device 2 may control the connection process and the disconnection process with respect to the GW 1 using the BLE IF of the BLE device 2. In this case, the CPU of the BLE device 2 may transmit the IC capability (or IC capability information), the device identification information, and the attribute name list to the GW 1, in response to the request from the GW 1. Further, the CPU of the BLE device 2 may perform processes, such as a process of transmitting the data (including sensor data), acquired from the sensor part 2A or the like, to the GW 1 using the BLE IF of the BLE device 2, a process of receiving the data from the application program of the cloud server 3 via the BLE IF of the BLE device 2, or the like.

<<Advantageous Features of First Embodiment>>

According to the first embodiment, the GW 1 stores the information indicating the connection records of the connection of the BLE device 2. In a case in which the GW 1 stores the information indicating the connection records of the BLE device 2, that is the target to be connected to the GW 1, and the BLE device 2 is to be reconnected to the GW 1, the pairing method that requires no manual operations of the user (and automatically performs the operations) is automatically selected (or determined).

For this reason, it is possible to eliminate the need for an operator to go to the set-up location (or site) of the BLE device 2 in order to reconnect the BLE device 2 to the GW 1, and eliminate the need for the operator to perform a troublesome operation of manually inputting information to the BLE device 2 and the GW 1. In other words, it is possible to easily perform the pairing associated with the reconnection of the BLE device 2 to the GW 1.

In addition, the GW 1 can verify, without user intervention, whether the BLE device 2 that is the target to be connected (that is, reconnected) to the GW 1 is identical to the original BLE device 2 originally connected to the GW 1, using the internal information of the BLE device 2 that is the target to be reconnected. Hence, in a case in which a BLE device that is the target to be connected to the GW 1 is an unauthorized device different from the original BLE device 2 originally connected to the GW 1, the unauthorized device will not be verified and can be disconnected from the GW 1, to secure safe communication of the GW 1.

Second Embodiment

Next, a second embodiment will be described. Many aspects of the second embodiment are the same as those of the first embodiment, and only the aspects of the second embodiment different from those of the first embodiment will be described hereinafter.

According to the BLE specifications, a random address is prescribed for the BD address, and the BD address of a BLE device may be changed with every reboot. In such a BLE device, it is always the case that no connection records exist for the BLE device, and the pairing that requires manual operations each time is requested. The process of the second embodiment will be described with respect to the BLE device 2 having the random address prescribed for the BD address.

Figure 10:
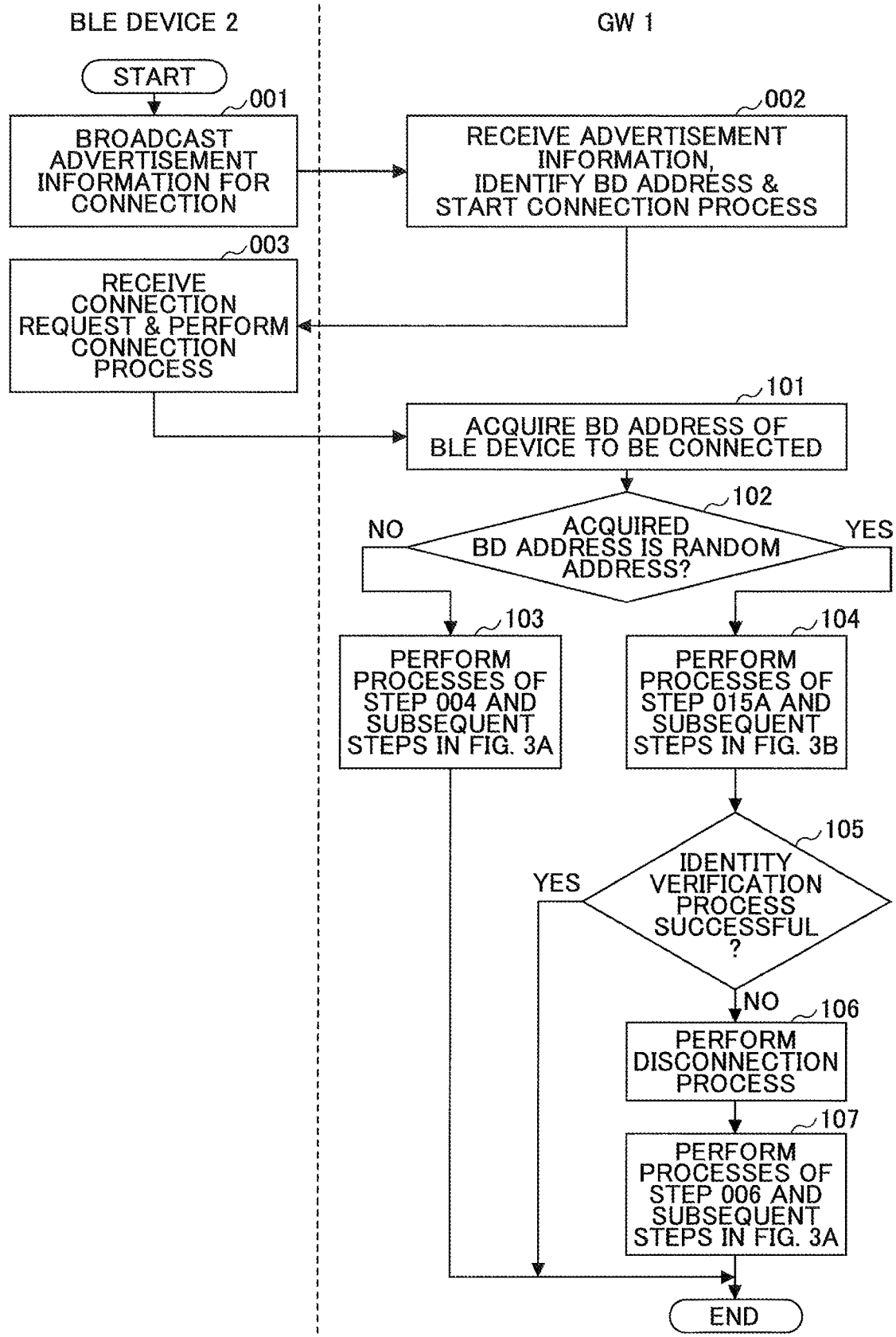
FIG. 10 is a flow chart for explaining an example of a process in a second embodiment.

FIG. 10 is a flow chart for explaining an example of a process in the second embodiment. For example, the process illustrated in FIG. 10 is performed by the CPU 41 of the GW 1. In FIG. 10 the processes of steps 001, 002, and 003 are the same as those of the first embodiment, and a description thereof will be omitted.

In step 101, the CPU 41 of the GW 1 acquires the BD address of the BLE device 2 that is the target to be connected to the GW 1. In step 102, the CPU 41 of the GW 1 judges whether the acquired BD address is a random address. When the acquired BD address is not a random address and a judgment result in step 102 is NO, the process advances to step 103 so that the CPU 41 of the GW 1 performs the processes of step 004 and subsequent steps illustrated in FIG. 3A. On the other hand, when the acquired BD address is a random address and the judgment result in step 102 is YES, the process advances to step 104. In step 104, the CPU 41 of the GW 1 outputs Type 4 as the IO capability of the GW 1, to exchange the cipher key using "Just Works". In addition, in step 104, the CPU 41 of the GW 1 performs the processes of step 015A and subsequent steps illustrated in FIG. 3B, to perform the identity verification process.

In step 105, the CPU 41 of the GW 1 judges whether the identity verification process is successful and the BLE device 2 to be connected to the GW 1 is the original BLE device 2 originally connected to the GW 1. When the identity verification process fails and a judgment result in step 105 is NO, the process advances to step 106. In step 106, the CPU 41 of the GW 1 performs a disconnection process to disconnect the BLE device 2 from the GW 1. Step 107 may be performed after step 106. In step 107, the CPU 41 of the GW 1 performs the processes of step 006 and subsequent steps illustrated in FIG. 3A.

The process illustrated in FIG. 10 ends after step 103 or 107, or when the judgment result in step 105 is YES.

The second embodiment changes the number of methods used, from among the plurality of methods, to judge whether the BLE devices (or terminals) 2 that are targets to be connected to the GW 1 are identical to the BLE devices 2 having the connection records, according to the number of BLE devices 2 that are the targets to be connected to the GW 1. According to the second embodiment, in the case in which the BD address is the random address, Type 4 is selected to reduce operations (or operation load) by automatically performing the pairing using "Just Works". In addition, in a case in which a BLE device that is the target to be connected to the GW 1 is an unauthorized device different from the original BLE device 2 originally connected to the GW 1, the unauthorized device will not be verified by the identity verification process, and the unauthorized device can be disconnected from the GW 1, to secure safe communication of the GW 1.

Third Embodiment

Next, a third embodiment will be described. Many aspects of the third embodiment are the same as those of the first embodiment, and only the aspects of the third embodiment different from those of the first embodiment will be described hereinafter.

In the first embodiment described above, all of the first through fourth verification methods vm1 through vm4 are basically used to verify the identity of the BLE device 2 that is to be reconnected to the GW 1. However, when only one BLE device 2 having the same BD address as the disconnected BLE device 2 is located in a periphery of the GW 1, within a range communicable with the GW 1, at the time of reconnection to the GW 1, the possibility of permitting an unauthorized connection is small or negligible even if the identity verification process with respect to the BLE device 2 is simplified. Moreover, by simplifying the identity verification process, it is possible to reduce the communication required to reconnect the BLE device 2 to the GW 1, and the power consumption of the BLE device 2 can be reduced. Battery drain can be reduced in a case in which the BLE device 2 is battery-powered.

On the other hand, when a plurality of BLE devices 2 having the same BD address as the disconnected BLE device 2 are located in the periphery of the GW 1, within the range communicable with the GW 1, at the time of reconnection to the GW 1, the identity verification process needs to be strictly performed in order not to permit unauthorized connections of unauthorized devices. The third embodiment is designed to cope with these cases in which one or more BLE devices 2 having the same BD address as the disconnected BLE device 2 are located within the range communicable with the GW 1.

The third embodiment may employ the configuration of the GW 1 illustrated in FIG. 2 described above in conjunction with the first embodiment. However, when the connection controller 12 of the GW 1 performs the scan process to scan and detect the BLE device 2, the connection controller 12 in the third embodiment stores the number of BLE devices 2 in the vicinity of the GW 1 broadcasting the advertisement information (or advertisement message) for connection. The connection controller 12 of the GW 1 notifies the stored number of BLE devices 2 in the vicinity of the GW 1 broadcasting the advertisement information when the connection authorization judgment unit 15 judges whether to authorize the connection of the BLE device 2 to the GW 1, using the internal information of the BLE device 2 acquired from the BLE device 2. Further, the identity verification method used by the connection authorization judgment unit 15 of the GW 1 is selected (or determined) according to the stored number of BLE devices 2 in the vicinity of the GW 1 broadcasting the advertisement information.

Figure 11:
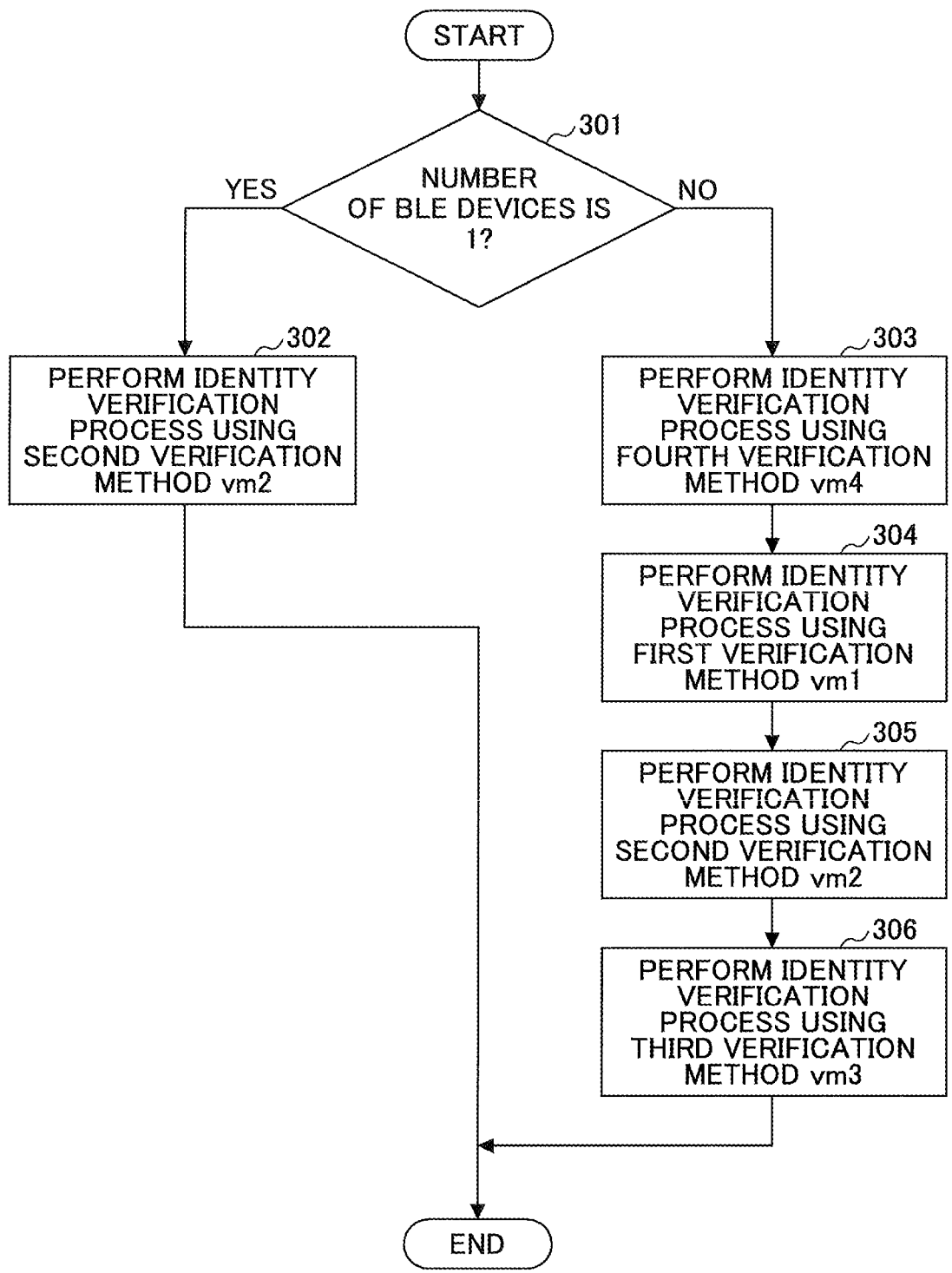
FIG. 11 is a flow chart for explaining an example of a process in a third embodiment.

FIG. 11 is a flow chart for explaining an example of a process in the third embodiment. More particularly, FIG. 11 illustrates the process of the CPU 41 (or connection authorization judgment unit 15) of the GW 1 in the third embodiment. The process illustrated in FIG. 11 changes the identity verification method to be used, according to whether only one BLE device 2 or a plurality of BLE devices 2 are located in the periphery of the GW 1.

In step 301 illustrated in FIG. 11, the CPU 41 of the GW 1 judges whether the number of BLE devices 2 in the vicinity of the GW 1, that is, within the range communicable with the GW 1, is 1. When a judgment result in step 301 is YES, the process advances to step 302. In step 302, the CPU 41 of the GW 1 performs the identity verification process using the second verification method vm2, among the first through fourth verification methods vm1 through vm4, and the process ends.

On the other hand, when the number of BLE devices 2 in the vicinity of the GW 1 is more than 1 and the judgment result in step 301 is NO, the process advances to step 303. In step 303, the CPU 41 of the GW 1 performs the identity verification process using the fourth verification method vm4. In step 304, the CPU 41 of the GW 1 performs the identity verification process using the first verification method vm1. In step 305, the CPU 41 of the GW 1 performs the identity verification process using the second verification method vm2. In step 306, the CPU 41 of the GW 1 performs the identity verification method using the third verification method vm3. In this example, the identity verification processes are performed using the fourth, first, second, and third verification methods vm4, vm1, vm2, and vm3 in this order. However, the order in which the first, second, third, and fourth verification methods vm1, vm2, vm3, and vm4 are used by the identity verification processes may be appropriately changed.

The third embodiment changes the number of identity verification methods used to verify each BLE device (or terminal) 2 to be connected to the GW 1, having the same BD address as the original BLE device 2 originally connected to the GW 1, according to the number of BLE devices 2 that are in the vicinity of the GW 1, that is, within the range communicable with the GW 1. Hence, according to the third embodiment, it is possible to reduce the communication required to reconnect the BLE device 2 to the GW 1, and the power consumption of the BLE device 2 can be reduced.

Therefore, according to each of the embodiments described above, it is possible to facilitate the key exchange associated with reconnection of a terminal.

Further, the configurations of the embodiments described above are examples, and the embodiments may be combined where appropriate.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A short-range wireless communication apparatus comprising:
   a storage device configured to store information indicating connection records of one or a plurality of terminals; and
   a processor configured to perform a process including
      selecting one of a plurality of pairing methods of exchanging a cipher key for communication with a target terminal, which does not have a bonding capability that stores the cipher key exchanged by a pairing for use upon a reconnection and would otherwise eliminate user intervention at a time of the reconnection, and is to be connected to the short-range wireless communication apparatus, according to a combination of an input and output capability of the short-range wireless communication apparatus and an input and output capability of the target terminal; and outputting the input and output capability of the short-range wireless communication apparatus that causes the combination to select a pairing method that exchanges, without the user intervention, the cipher key with the target terminal when the information indicating the connection records of the target terminal is stored in the storage device to indicate the reconnection to the target terminal.

2. The short-range wireless communication apparatus as claimed in claim 1, wherein the storage device stores internal information of the one or plurality of terminals having the connection records, and wherein the processor performs the process further including disconnecting the target terminal from the short-range wireless communication apparatus when the storage device stores no internal information matching internal information acquired from the target terminal.

3. The short-range wireless communication apparatus as claimed in claim 2, wherein the internal information of the one or plurality of terminals having the connection records includes device identification information of the one or plurality of terminals having the connection records.

4. The short-range wireless communication apparatus as claimed in claim 2, wherein the internal information of the one or plurality of terminals having the connection records include an attribute name of the one or plurality of terminals having the connection records.

5. The short-range wireless communication apparatus as claimed in claim 1, wherein the storage device stores a log of data measured by one terminal having the connection records, and wherein the processor performs the process further including disconnecting the target terminal from the short-range wireless communication apparatus when a value of data acquired from the target terminal falls outside a tolerable range of a change in the data, obtained from the log of the data stored in the storage device.

6. The short-range wireless communication apparatus as claimed in claim 1, wherein the storage device stores data written to one terminal having the connection records, and wherein the processor performs the process further including disconnecting the target terminal from the short-range wireless communication apparatus when no data matching the data written to the one terminal having the connection records and stored in the storage device is acquired from the target terminal.

7. The short-range wireless communication apparatus as claimed in claim 1, wherein the outputting outputs the input and output capability of the short-range wireless communication apparatus that causes the combination to select the pairing method that exchanges the cipher key with the target terminal when an address of the target terminal is a random address, and wherein the processor performs the process further including judging whether information indicating the connection records of the target terminal is stored in the storage device when the address of the target address is not the random address.

8. The short-range wireless communication apparatus as claimed in claim 1, wherein the processor performs the process further including changing a number of verification methods used to verify whether each target terminal is identical to the terminal having the connection records stored in the storage device, from a plurality of verification methods, according to a number of target terminals that have identical addresses and are located within a range communicable with the short-range wireless communication apparatus.

9. A communication system comprising:

the one or plurality of terminals; and the short-range wireless communication apparatus as claimed in claim 1, wherein the short-range wireless communication apparatus is communicable with the one or plurality of terminals.

10. A communication control method comprising:

storing, in a storage device of a short-range wireless communication apparatus, information indicating connection records of one or a plurality of terminals;

selecting, by a processor of the short-range wireless communication apparatus, one of a plurality of pairing methods of exchanging a cipher key for communication with a target terminal, which does not have a bonding capability that stores the cipher key exchanged by a pairing for use upon a reconnection and would otherwise eliminate user intervention at a time of the reconnection, and is to be connected to the short-range wireless communication apparatus, according to a combination of an input and output capability of the short-range wireless communication apparatus and an input and output capability of the target terminal; and outputting, by the processor of the short-range wireless communication apparatus, the input and output capability of the short-range wireless communication apparatus that causes the combination to select a pairing method that exchanges, without the user intervention, the cipher key with the target terminal when the information indicating the connection records of the target terminal is stored in the storage device to indicate the reconnection to the target terminal.

11. The communication control method as claimed in claim 10, further comprising:

storing, in the storage device of the short-range wireless communication apparatus, internal information of the one or plurality of terminals having the connection records; and disconnecting the target terminal from the short-range wireless communication apparatus, by the processor of the short-range wireless communication apparatus, when the storage device stores no internal information matching internal information acquired from the target terminal.

12. A non-transitory computer-readable storage medium having stored therein a program which, when executed by a computer of a short-range wireless communication apparatus, causes the computer to perform a process comprising:
  storing, in a storage device of the short-range wireless communication apparatus, information indicating connection records of one or a plurality of terminals;
  selecting one of a plurality of pairing methods of exchanging a cipher key for communication with a target terminal, which does not have a bonding capability that stores the cipher key exchanged by a pairing for use upon a reconnection and would otherwise eliminate user intervention at a time of the reconnection, and is to be connected to the short-range wireless communication apparatus, according to a combination of an input and output capability of the short-range wireless communication apparatus and an input and output capability of the target terminal; and
  outputting the input and output capability of the short-range wireless communication apparatus that causes the combination to select a pairing method that exchanges, without the user intervention, the cipher key with the target terminal when the information indicating the connection records of the target terminal is stored in the storage device to indicate the reconnection to the target terminal.

13. The non-transitory computer-readable storage medium as claimed in claim 12, wherein the computer performs the process further comprising:
  storing, in the storage device of the short-range wireless communication apparatus, internal information of the one or plurality of terminals having the connection records; and
  disconnecting the target terminal from the short-range wireless communication apparatus, by a processor of the short-range wireless communication apparatus, when the storage device stores no internal information matching internal information acquired from the target terminal.

14. The non-transitory computer-readable storage medium as claimed in claim 13, wherein the internal information of the one or plurality of terminals having the connection records includes device identification information of the one or plurality of terminals having the connection records.

15. The non-transitory computer-readable storage medium as claimed in claim 13, wherein the internal information of the one or plurality of terminals having the connection records include an attribute name of the one or plurality of terminals having the connection records.

16. The non-transitory computer-readable storage medium as claimed in claim 12, wherein the computer performs the process further comprising:
  storing, in the storage device, a log of data measured by one terminal having the connection records; and
  disconnecting the target terminal from the short-range wireless communication apparatus when a value of data acquired from the target terminal falls outside a tolerable range of a change in the data, obtained from the log of the data stored in the storage device.

17. The non-transitory computer-readable storage medium as claimed in claim 12, wherein the computer performs the process further comprising:
  storing, in the storage device, data written to one terminal having the connection records; and
  disconnecting the target terminal from the short-range wireless communication apparatus when no data matching the data written to the one terminal having the connection records and stored in the storage device is acquired from the target terminal.

18. The non-transitory computer-readable storage medium as claimed in claim 12,
  wherein the outputting outputs the input and output capability of the short-range wireless communication apparatus that causes the combination to select the pairing method that exchanges the cipher key with the target terminal when an address of the target terminal is a random address, and
  wherein the computer performs the process further comprising:
    judging whether information indicating the connection records of the target terminal is stored in the storage device when the address of the target address is not the random address.

19. The non-transitory computer-readable storage medium as claimed in claim 12, wherein the computer performs the process further comprising:
  changing a number of verification methods used to verify whether each target terminal is identical to the terminal having the connection records stored in the storage device, from a plurality of verification methods, according to a number of target terminals that have identical addresses and are located within a range communicable with the short-range wireless communication apparatus.

* * * * *